United States Patent Office 3,523,806
Patented Aug. 11, 1970

3,523,806
PLASTER OF PARIS BANDAGE MANUFACTURE
David F. Smith, 120 Grove St.,
Bay Head, N.J. 08742
No Drawing. Filed Apr. 26, 1967, Ser. No. 633,708
Int. Cl. C04b 11/14
U.S. Cl. 106—114     13 Claims

ABSTRACT OF THE DISCLOSURE

This invention discloses methods of making plaster of Paris bandages through use of a slurry of powdered plaster of Paris in an aqueous liquid containing ammonia and dextrin which delays the setting of the plaster while the slurry is coated on a suitable backing material and the so-coated material is dried to yield a settable, coherent bandage which can be rapidly wet in water and formed into a cast.

---

Plaster of Paris bandages are used in medical practice, particularly in orthopedics, to form a cast over parts of the human or animal body requiring immobilization and/or support. Modern types are made by forming a slurry of powdered plaster in a liquid in which the plaster does not set during processing, coating the slurry on a flexible, porous backing material like 32 x 28 mesh surgical gauze and evaporating the liquid from the so-coated backing in a circulating air oven at a temperature of from 190 to 260° F. to yield a dry, settable, coherent bandage material that can be rapidly wet in water, the excess water squeezed out and the wet bandage formed into a cast. Such a slurry liquid may, for example, be a volatile non-aqueous liquid like an alcohol or it may be water to which a material has been added to prevent setting during processing (set-inhibitor) but which after drying the slurry, leaves no appreciable residue to substantially slow the set of the dry, final product. A water slurry has the advantages of cheapness and the ability to dissolve certain materials desirable to use as set accelerators or as agents to bond the plaster particles to themselves and to the backing. In the past such set-inhibitors have been ammonium borate (U.S. Pat. No. 2,557,083), ammonium borate and ammonia (U.S. Pat. No. 3,294,087), ammonium caseinate (U.S. Pat. No. 3,191,597) or ammonium caseinate and ammonia (U.S. Pat. No. 3,282,265). During the heating to dry the coated backing the ammonia is evaporated and the ammonium salts are hydrolyzed so that the final bandage is not largely delayed in its set when wet in water preparatory to making a cast. However, there usually are traces of the ammonium salts remaining after drying, which may slow the set a matter of a minute or more unless the drying is very carefully controlled. Since it is required that the product set in from 3 to 8 minutes (about 2½ to 3½ minutes in the case of the so-called "extra-fast setting" bandage), for example, as required in Federal Specification GG-B-101d, June 2, 1959, this relatively minor slowing of the set is still of practical significance.

The present invention discloses a method of delaying the set of the plaster in the slurry without the use of ammonium salts. The following examples illustrate how this is accomplished. (All proportions hereinafter given are by weight unless otherwise noted.)

EXAMPLE 1

A solution was made of the following composition:

| | Parts |
|---|---|
| Aqueous ammonia (29.4% $NH_3$) | 100 |
| Dextrin A | 6 |
| Water | 16 |

The above solution was prepared by dissolving 50 parts of the dextrin, Type A, in 133 parts water at about 180° F., cooling and adding aqua ammonia. The final concentration of $NH_3$, based on the weight of $NH_3$ plus $H_2O$, was 25.3%. The above solution was mixed with 239 parts of finely-divided plaster of Paris, designated Type A. The life of the slurry was more than 70 hours.

EXAMPLE 2

A solution was made as in Example 1 except that a different dextrin, designated Type B, was used. The life of the slurry was more than 69 hours.

EXAMPLE 3

A solution was made as in Example 1 but with a final $NH_3$ concentration of 22.8%. The slurry again had a life of over 70 hours.

EXAMPLE 4

A solution was made as in Example 1 with dextrin A but with a final $NH_3$ concentration of 19.0%. The slurry had a life of about 47 hours.

EXAMPLE 5

A solution was made as in Example 1 with dextrin A but with a final $NH_3$ concentration of 12.65%. The slurry had a life of over 5 hours but less than 19 hours.

EXAMPLE 6

A solution containing 25.3% $NH_3$ and 74.7% water with no dextrin, when slurried with another sample of the same plaster used in Examples 1–5, had a slurry life of about 2 hours.

EXAMPLE 7

100 parts of finely-divided plaster of Paris designated Type B, was slurried with the folowing solution:

| | Parts |
|---|---|
| Water | 17.1 |
| Aqua $NH_3$(29.4% $NH_3$) | 39.5 |
| Starch (steam cooked in part of the above water at a concentration below about 12% starch) | 1.3 |
| Dextrin A (stirred into the hot starch solution and the solution then cooled) | 0.65 |
| Finely-divided potassium sulfate | 2.0 |

The above solution thus contained 20.6% $NH_3$ based on the total weight of water plus $NH_3$. The slurry had a life of about 20 hours and when coated upon 32 x 28 mesh surgical gauze and dried in a circulating air oven at about 220° F. to yield a dry bandage weighing about 47 grams per square foot, had a setting-time of 2 minutes 44 seconds as determined by the method of the above-cited Federal Specification. This slurry without the dextrin had a life of about 2 hours.

The dextrin designated Type A, made by partial hydrolysis of corn starch, through the action of HCl (3 gallons of commercial concentrated hydrochloric acid per 8000 pounds of starch) and heat, dissolves to the extent of 4 to 9% in 1 hour in water at 25° C. Type B dextrin is similar except it is a somewhat less hydrolyzed corn starch and is soluble to the extent of about 3 to 7% in 1 hour in water at 25° C. The traces of acid in dextrin are usually neutralized with sodium carbonate. Sometimes the starch is hydrolyzed in the presence of minor proportions of "catalyst" which in the case of the dextrins used herein (Type A, called Texcote-6 made by Stein-Hall Co., New York, N.Y. and Type B, called Texcote-4 by the same manufacturer) a minor proportion of acetic acid was used as catalyst. The protein content is less than 0.4% of the weight of the dextrin. Type A, being less soluble in cold water than Type B, forms a less viscous solution—the former has the same viscosity in a solution containing 1 part in 2½ parts water as does 1 part of Type B in 4 parts water. Dextrins can also be made similarly from other starches such as white potato, sweet potato and tapioca. Before being used for applicant's purposes it must, of course, be assured that no extraneous materials are present of a nature and in amount sufficient to slow the set of the bandage—such, for example, as phosphates, borates or amino acids. The moisture content of dextrins may be 8 to 12%. Slurry liquids like those used in the above examples, with dextrin but without NH₃, would give slurries with minimal life—1 hour or less, and would be useless for the purpose since a slurry life of at least several hours is required, especially when a batch coating operation is used. Since the slurry is slowly setting in any case, the longer the slurry life, other things being equal, the less the slurry changes in a given period of time.

The plaster designated Type A, separate samples of which where used in Examples 1 to 6, was from a source different from that of the plaster designated Type B and used in Example 7. It is to be noted that plasters from different sources and, indeed, from different batches from the same source, may give slurries of different life—the life being, of course, the time needed for the plaster to set in a given slurry. This presumably is due to the presence of minor proportions of certain extraneous material. For example, plaster usually contains minor amounts of set plaster (sometimes called Terra Alba) and the set plaster may vary in amount and can largely vary in its activity in speeding the set. The life of a slurry also depends upon the amount it is stirred and the nature of the stirring. Suitable plaster must be ground to the point where it contains no appreciable proportion of particles larger than 100 mesh U.S. Standard screen size and usually not over about 1% above 200 mesh. A considerable proportion may be as fine as 325 mesh. (See above-cited Federal Specification for particle-size specification.)

The examples show the marked effect of dextrin in increasing the life of the slurry and there appears to be a synergistic action between dextrin and ammonia in increasing the life of the slurry. Furthermore, Example 7 shows the very fast set of the bandage made using dextrin and ammonia as compared with the set of a bandage where considerable proportions of ammonium borate or caseinate are used in the slurry under comparable conditions otherwise.

The amount of NH₃ in the slurry liquid can vary between about 8% and 29% of the weight of NH₃ plus water and the amount of dextrin can vary between about 0.25% and 1.5% (preferably 0.5 to 1%) of the weight of the plaster of Paris, or from about 0.4% to 2.6% of the weight of NH₃ plus water in the slurry liquid. The amount of the set-accelerator, potassium sulfate, may vary from about 0.5% to 2.5% of the weight of plaster or the same amounts of zinc sulfate or of mixtures of potassium and zinc sulfates may be used. When zinc sulfate is used the NH₃ may be increased in amount necessary to form the stable Zn(NH₃)₄ cation.

Bonding agents such as cooked starch, methyl cellulose, hydroxypropyl methyl cellulose, hydroxyethyl ethyl cellulose, hydroxyethyl methyl cellulose, a dispersion of polyvinyl acetate and mixtures of these, may be added to the slurry in amounts from about 0.25% to about 1.5% of the weight of the plaster.

The proportion of slurry liquid to plaster may vary widely depending upon the density and particle size of the plaster, the proportion of NH₃ in the slurry liquid and the method used to coat the slurry on the backing—the upper limit of plaster being that where the liquid no longer completely wets the plaster. Normally there will be from 40 to 110 parts liquid per 100 parts plaster, preferably 50 to 70 parts liquid per 100 parts plaster. The slurry life is not largely dependent upon the proportion of liquid to plaster—a given liquid will set a small proportion of plaster in about the same time as it will a large proportion, within practical limits.

What is claimed is:
1. A settable plaster of Paris mix consisting of powdered plaster of Paris and aqueous ammonia containing 8 to 29 weight percent NH₃ and 0.4 to 2.6 weight percent dextrin, said mix being free of ammonium salts of casein and boric acid.
2. The mix of claim 1 which further contains from 0.25 to 1.5% of the weight of the plaster of Paris of a bonding agent selected from the class consisting of methyl cellulose, hydroxypropyl methyl cellulose, hydroxyethyl methyl cellulose, hydroxyethyl ethyl celluose, cooked starch, polyvinyl acetate dispersion and mixtures of same.
3. The mix of claim 2 which further contains from 0.5 to 2.5% of the weight of plaster of Paris of a set accelerator selected from the class consisting of potassium sulfate, zinc sulfate and mixtures of same.
4. The mix of claim 3 wherein the said set accelerator selected is potassium sulfate.
5. The mix of claim 4 wherein the amount of dextrin is from 0.5 to 1% of the weight of the plaster of Paris.
6. The mix of claim 4 wherein the amount of dextrin is from 0.25 to 1.5% of the weight of plaster of Paris.
7. The method of making a plaster of Paris bandage which comprises in succession the steps of: (1) making a slurry of powdered plaster of Paris in an aqueous ammonia solution containing from 8 to 29% NH₃ and from 0.4 to 2.6% dextrin based on the weight of NH₃ plus water and from 0.5 to 2.5% potassium sulfate based on the weight of plaster of Paris; (2) coating the slurry of step (1) upon a flexible, porous backing material; (3) evaporating the NH₃ and water from the so-coated material at a temperature of from 190 to 260° F. whilst the plaster of Paris remains substantially unset, to produce a dry, settable, water-wettable plaster of Paris bandage.
8. The method of claim 7 wherein the said solution of step (1) further contains from 0.25 to 1.5% of the weight of the plaster of Paris of a bonding agent selected from the class consisting of methyl cellulose, hydroxypropyl methyl cellulose, hydroxyethyl methyl cellulose, hydroxyethyl ethyl cellluose, cooked starch, polyvinyl acetate dispersion and mixtures of same.
9. The method of claim 7 wherein the said dextrin of step (1) is in amount from 0.25 to 1.5% of the weight of plaster of Paris.
10. The method of claim 7 wherein the said dextrin of step (1) is in amount from 0.5 to 1% of the weight of plaster of Paris.
11. The method of claim 8 wherein the said dextrin of step (1) is in amount from 0.25 to 1.5% of the weight of plaster of Paris.
12. The method of claim 8 wherein the said dextrin of step (1) is in amount from 0.5 to 1% of the weight of plaster of Paris.
13. The mix of claim 5 wherein the said dextrin is in amount from 0.25 to 1.5% of the weight of plaster of Paris.

References Cited
UNITED STATES PATENTS
3,043,298   7/1962   Brickman et al. _____ 106—115
3,294,087  12/1966   Smith _____ 106—114

JAMES E. POER, Primary Examiner

U.S. Cl. X.R.

106—115